US011644910B2

(12) United States Patent
Leu et al.

(10) Patent No.: US 11,644,910 B2
(45) Date of Patent: May 9, 2023

(54) DEVICE CONTROL APPARATUS AND DEVICE CONTROL METHOD

(71) Applicant: Panasonic Intellectual Property Corporation of America, Torrance, CA (US)

(72) Inventors: Randall Chang Leu, Cupertino, CA (US); Casey Joseph Carlin, San Jose, CA (US); Yusuke Urakami, Mountain View, CA (US)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/219,047

(22) Filed: Mar. 31, 2021

(65) Prior Publication Data

US 2021/0216152 A1  Jul. 15, 2021

Related U.S. Application Data

(63) Continuation of application No. PCT/JP2019/031674, filed on Aug. 9, 2019.

(Continued)

(51) Int. Cl.
*G06F 3/0362* (2013.01)

(52) U.S. Cl.
CPC .................... *G06F 3/0362* (2013.01)

(58) Field of Classification Search
CPC ...... G06F 3/0362; G06F 3/016; G06F 1/1601; G06F 3/02; G06F 3/03548; G06F 3/0482; H01H 25/06

See application file for complete search history.

(56) References Cited

U.S. PATENT DOCUMENTS 5,085,394 A * 2/1992 Torii ................. G06F 1/1616
248/455
5,345,362 A * 9/1994 Winkler ............ A61N 1/37235
361/679.55

(Continued)

FOREIGN PATENT DOCUMENTS

JP  10-172390  * 6/1998 ............. H01H 25/06
JP  2015-133233  7/2015

(Continued)

OTHER PUBLICATIONS

International Search Report (ISR) dated Sep. 24, 2019 in International (PCT) Application No. PCT/JP2019/031674.

*Primary Examiner* — Benyam Ketema
(74) *Attorney, Agent, or Firm* — Wenderoth, Lind & Ponack, L.L.P.

(57) ABSTRACT

A device control apparatus includes: a base panel; a screen which displays information; a moveable/rotatable switch panel over the base panel; a connector that moveably connects the switch panel and base panel; a sensor which detects movement of the switch panel; and a controller which controls: displaying, on the screen, first information associated with a detected first movement of the switch panel, and identifying at least one outside device; displaying, on the screen in response to a subsequently-detected second movement of the switch panel, second information including function items or modes of one outside device included in the at least one outside device and third information on the one outside device; instructing the one outside device to perform a function item or change a mode selected by a user in response to the second information; and continuing the displaying of the second and third information, while the instructing is performed.

10 Claims, 19 Drawing Sheets

Related U.S. Application Data

(60) Provisional application No. 62/741,238, filed on Oct. 4, 2018.

(56) References Cited

U.S. PATENT DOCUMENTS

| | | | | |
|---|---|---|---|---|
| 5,648,889 A * | 7/1997 | Bosli | H01L 23/4006 | 257/E23.084 |
| 6,005,767 A * | 12/1999 | Ku | G06F 1/1637 | 345/169 |
| 6,282,082 B1 * | 8/2001 | Armitage | G06F 1/1698 | 345/169 |
| 6,297,945 B1 * | 10/2001 | Yamamoto | G06F 1/1647 | 345/169 |
| 6,829,139 B1 * | 12/2004 | Duarte | H04M 1/0237 | 361/679.02 |
| 7,099,150 B2 * | 8/2006 | Lee | G06F 1/1632 | 361/679.02 |
| 7,273,089 B2 * | 9/2007 | Hata | G06F 1/1616 | 165/80.4 |
| 7,876,554 B2 * | 1/2011 | Chou | H05K 5/0204 | 248/65 |
| 8,687,360 B2 * | 4/2014 | Nakada | G06F 1/1616 | 361/679.55 |
| 9,477,329 B1 * | 10/2016 | Ding | G06F 3/0362 | |
| 11,132,089 B2 * | 9/2021 | Tomaru | G05G 1/01 | |
| 2004/0017652 A1 * | 1/2004 | Billington | G06F 1/1632 | 361/679.41 |
| 2004/0090742 A1 * | 5/2004 | Son | G06F 1/3203 | 361/679.44 |
| 2005/0284737 A1 * | 12/2005 | Shitanaka | H01H 25/04 | 200/5 R |
| 2006/0033760 A1 * | 2/2006 | Koh | G09G 5/363 | 345/649 |
| 2006/0075934 A1 * | 4/2006 | Ram | G06F 9/4416 | 108/44 |
| 2007/0188024 A1 * | 8/2007 | Shitanaka | G09F 13/04 | 307/10.1 |
| 2008/0024975 A1 * | 1/2008 | Huang | G06F 1/1679 | 361/679.44 |
| 2008/0231615 A1 * | 9/2008 | Tanaka | G05G 1/105 | 345/184 |
| 2011/0050541 A1 * | 3/2011 | Shin | G06F 1/1601 | 345/1.1 |
| 2011/0194237 A1 * | 8/2011 | Weng | G06F 1/1666 | 361/679.08 |
| 2016/0320960 A1 * | 11/2016 | Min | B60K 35/00 | |
| 2017/0038891 A1 * | 2/2017 | Lee | G06F 3/0484 | |
| 2018/0329623 A1 * | 11/2018 | Usami | G06F 3/04845 | |
| 2019/0243460 A1 | 8/2019 | Shigeta et al. | | |
| 2019/0291769 A1 * | 9/2019 | Kim | G06F 3/04883 | |
| 2021/0132787 A1 * | 5/2021 | Jung | G09B 21/004 | |
| 2021/0181887 A1 * | 6/2021 | Cha | G06F 3/0202 | |

FOREIGN PATENT DOCUMENTS

| | | | | |
|---|---|---|---|---|
| JP | 2018-34675 | * | 3/2018 | B60H 1/00 |
| WO | 2018/008225 | | 1/2018 | |

* cited by examiner

100A

100B

DEVICE CONTROL APPARATUS AND DEVICE CONTROL METHOD

CROSS REFERENCE TO RELATED APPLICATIONS

This application is a U.S. continuation application of PCT International Patent Application Number PCT/JP2019/031674 filed on Aug. 9, 2019, claiming the benefit of priority of U.S. Provisional Patent Application No. 62/741,238 filed on Oct. 4, 2018, the entire contents of which are hereby incorporated by reference.

BACKGROUND

1. Technical Field

The present disclosure relates to a device control apparatus and a device control method.

2. Description of the Related Art

Currently, a switch apparatus or a switch panel is widely used to control various electronic devices in a space such as a house, a building and a vehicle. A common switch apparatus is used to turn on or off of an electronic device or to select and adjust one of its functions. For example, a switch is used to turn on or off a ceiling light or to adjust the brightness of the light. In another example, a switch is used to turn on or off an air conditioner, to set a timer, to adjust the setting temperature, to change the wind direction or to adjust the strength of the wind.

In Patent Literature (PTL) 1 (International Publication No. 2018-008225), in order to reduce the user's burden of selecting a device to be operated, a state assumed by the body of the user is recognized, and a device is selected based on the recognized state assumed by the body.

SUMMARY

In a conventional switch apparatus, one action by a user is usually associated with one function and leads to only one result. Thus, another action is needed to control another function to get another result. Further, since one switch apparatus usually corresponds to one specific device such as a ceiling light, a desk lamp, an air conditioner, and an audio apparatus, individual action by the user is needed to turn on or off, or to select and control functions of each device.

Furthermore, in PTL 1, there are instances where misrecognition of the state assumed by the body, or the like, causes the device to be operated to be erroneously selected, and thus the burden on the user may increase.

One non-limiting and exemplary aspect of the present disclosure facilitates providing a device control apparatus that can control a plurality functions of a device or can control a plurality of devices in a simpler manner.

A device control apparatus according to an aspect of the present disclosure includes: a base panel; a screen which, in operation, displays information; a switch panel positioned over the base panel with a spacing in between, the switch panel being rotatable and moveable in at least one of a right and left direction, an up and down direction, and a backward and forward direction from an original position of the switch panel; one or more connectors that moveably connect the switch panel and the base panel; a sensor which, in operation, detects a movement of the switch panel; and a controller which, in operation, controls: displaying, on the screen, first information associated with a first movement of the switch panel that is detected, the first information enabling identification of at least one outside device; displaying, on the screen in response to a second movement of the switch panel detected after the first movement, (i) second information including a plurality of function items or modes of one outside device included in the at least one outside device included in the first information and (ii) third information on the one outside device; instructing the one outside device to perform a function item or change a mode selected by a user in response to the displaying of the second information; and continuing of the displaying of the second information and the third information, while the instructing is being performed.

It should be noted that general or specific aspects may be implemented as a system, a method, an integrated circuit, a computer program, a storage medium, or any selective combination thereof.

A device control apparatus according to an aspect of the present disclosure can control a plurality of functions of a device or can control a plurality of devices in a simpler manner.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Hereinafter, exemplary embodiments will be described in detail with reference to the Drawings.

Note that each of the exemplary embodiments described below shows a general or specific example. The numerical values, shapes, materials, structural components, the arrangement and connection of the structural components, steps, the processing order of the steps, etc., are mere examples, and thus are not intended to limit the claims.

Furthermore, the respective figures are not necessarily precise illustrations. In the figures, the same reference signs are given to substantially identical elements, and overlapping description is omitted or simplified.

Embodiment 1

Figure 1:
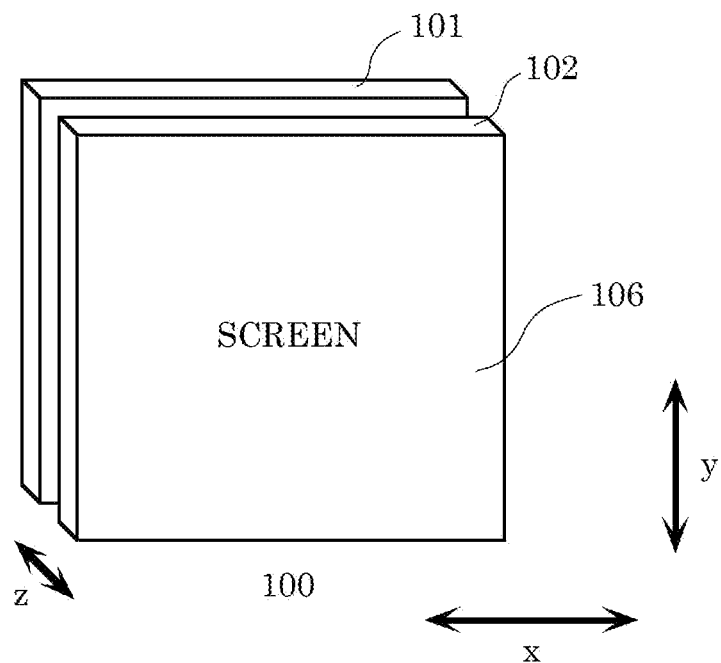
FIG. 1 illustrates an example of a device control apparatus of Embodiment 1.

FIG. 1 illustrates an example of device control apparatus 100 of Embodiment 1 of the present disclosure. Device control apparatus 100 in FIG. 1 includes base panel 101 and display panel 102 with screen 106. The display panel in this embodiment can be called as a switch panel.

Display panel 102 is positioned over base panel 101 with a spacing in between. Furthermore, screen 106 is attached to the front surface of display panel 102. Screen 106 may cover the whole front surface of display panel 102 or may cover a portion of the front surface of display panel 102. In FIG. 1, display panel 102 is located in its original position. But display panel 102 is moveable in at least one of a right and left direction (x direction), an up and down direction (y direction), and a backward and forward direction (z direction) from its original position. The original position of display panel 102 is a relative position with respect to base panel 101, and refers to a position of display panel 102 that serves as a reference. Specifically, the original position of display panel 102 is the position at which display panel 102 is present when force is not exerted on display panel 102 by the user. The original position may also be referred to as reference position, default position, or initial position.

Figure 2:
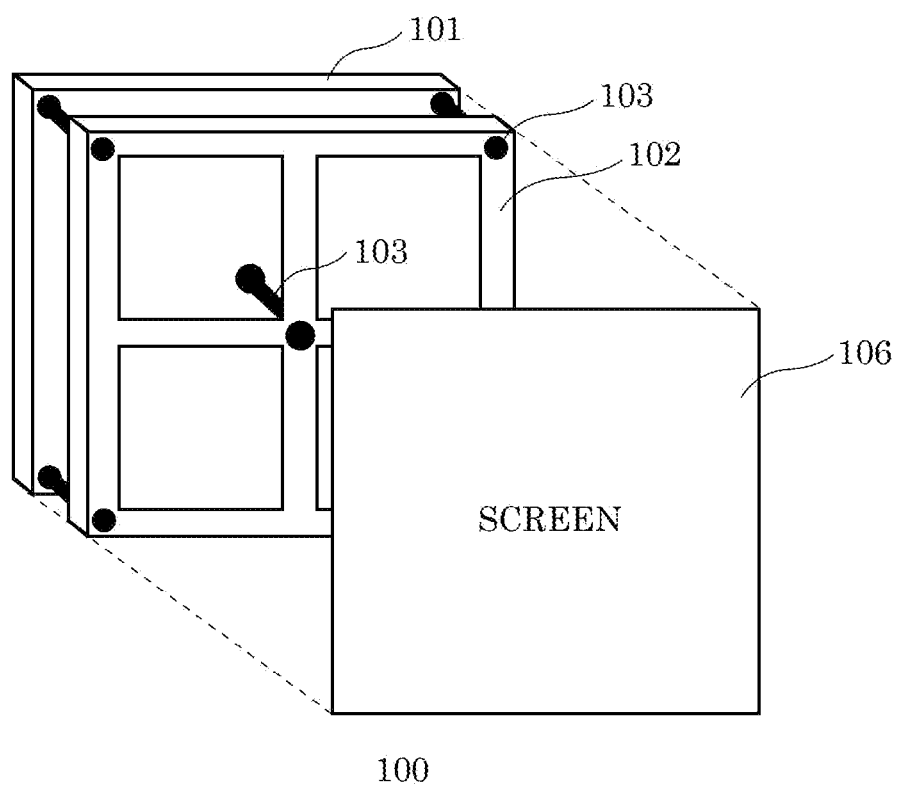
FIG. 2 illustrates an example structure of a device control apparatus of Embodiment 1.

FIG. 2 illustrates an example structure of device control apparatus 100 of Embodiment 1 of the present disclosure. Device control apparatus 100 includes base panel 101, display panel 102, a plurality of connectors 103, and screen 106.

Base panel 101 in FIG. 2 can be attached to a wall of an indoor space such as a house, a garage, an office space, a building, a parking lot, or a vehicle including a car, a van, a truck, and a plane. It can also be attached to an exterior wall of a house, a building, or an outer surface of a vehicle such as a car, a van, a truck, a motorbike, or a bicycle. The shape of base panel 101 can be square, rectangle, rounded square, rounded rectangle, oval, round, triangle, or any other shape. In order to decrease the weight of base panel 101, base panel 101 may have one or more cavities.

Base panel 101 may be installed in a drywall hole such as a hole normally for installing a standard single light switch. By installing base panel 101 in the drywall hole for a light switch, device control apparatus 100 is placed as a semi-permanent installment with access to constant power. In this case, base panel 101 is, for example, small enough to fit inside a drywall hole for a standard single switch. It should be noted that the size and placement of the base panel is not limited to this example.

Display panel 102 in FIG. 2 is positioned over base panel 101 with a spacing in between. Display panel 102 is attached to base panel 101 with a plurality of connectors 103.

As illustrated in FIG. 1, display panel 102 in FIG. 2 is moveable in at least one of a right and left direction, an up and down direction, and a backward and forward direction from its original position. The movement in the backward and forward direction is implemented respectively by push and pull of display panel 102. The movement in the right and left direction and in the up and down direction may be implemented by push or nudge by the user of display panel 102. If display panel 102 is moveable in all of the right and left direction, the up and down direction, and the backward and forward direction from its original position, the user experience of device control apparatus 100 will increase because a plurality function items of a device and/or a plurality of devices can be controlled by a simpler action by the user.

The shape and size of display panel 102 can be the same as or may be different from those of base panel 101. In order to decrease the weight of display panel 102, display panel 102 may have one or more cavities. Screen 106 may be attached on the front surface of display panel 102 such that the cavity will not be visible. Thus, the shape of screen 106 may be the same as that of display panel 102. In this disclosure, display panel 102 with screen 106 attached on it may be called just "a display panel".

Each of connectors 103 can be made of a spring, rubber, a string, or any other material that has an ability to pull back display panel 102 to its original position when display panel 102 is moved from its original position. Alternatively, some of connectors 103 may be composed of a plurality of elements such as a spring and a set of holders or a screw and a spring, as long as at least one of connectors 103 has an ability to pull back display panel 102 to its original position. Although the number of connectors 103 is five in FIG. 1, the number of connectors is not limited to this. The number of connectors can be one or plural as long as display panel 102 is maintained at its original position when there is no physical action by the user. The structure of each of connectors 103 can be the same or different.

Figure 3A:
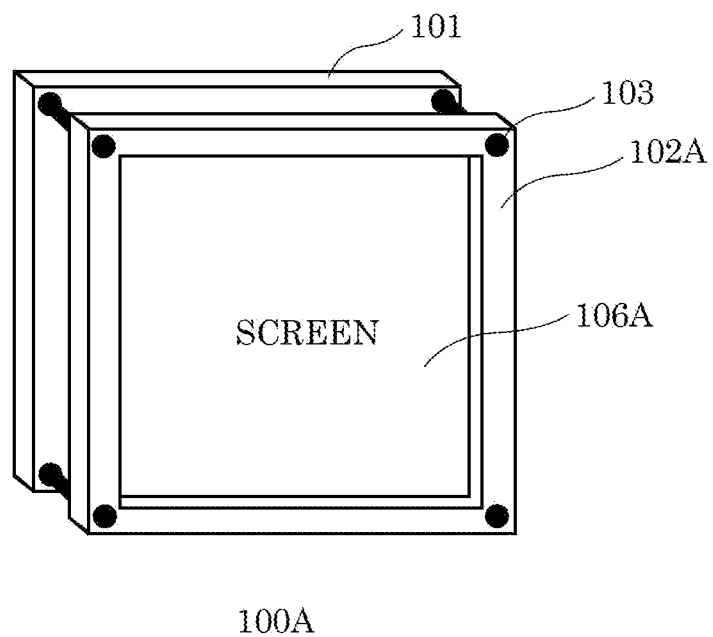
FIG. 3A illustrates another example structure of a device control apparatus of Embodiment 1.
Figure 3B:
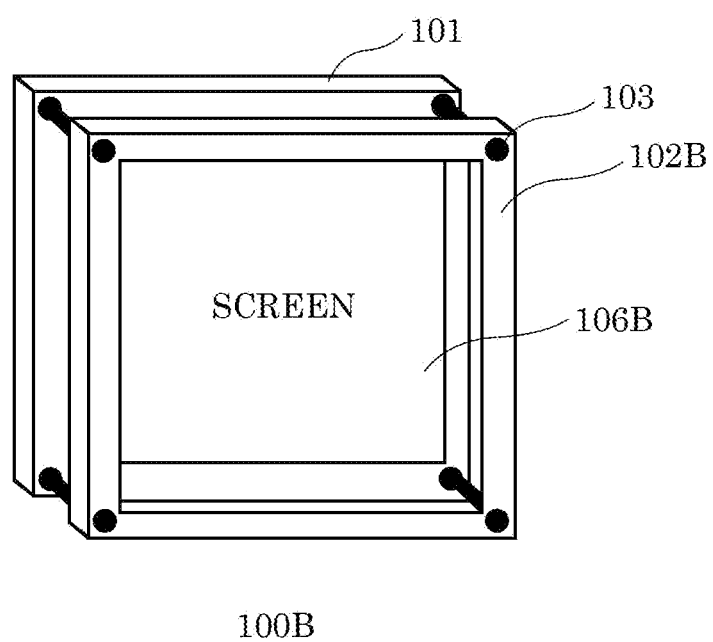
FIG. 3B illustrates another example structure of a device control apparatus of Embodiment 1.

Each of FIG. 3A and FIG. 3B illustrates another example structure of device control apparatuses 100A and 100B of Embodiment 1. In FIG. 3A, display panel 102A is a square-shaped frame and screen 106A is attached to a back surface of display panel 102A so that the user can see the screen through the square-shaped frame. Display panel 102A is attached to base panel 101 with a plurality of connectors 103. In FIG. 3B, display panel 102B is a square-shaped frame and screen 106B is attached to a front surface of base panel 101. Display panel 102B is attached to base panel 101 with a plurality of connectors 103.

Screens 106, 106A, and 106B in FIG. 2, FIG. 3A, and FIG. 3B may be utilized by a known electronic paper display technology. This allows screens 106, 106A, and 106B to always display information even when there is no interaction by the user. Such electronic paper display technology includes the E-Ink (electronic ink) technology.

Figure 4:
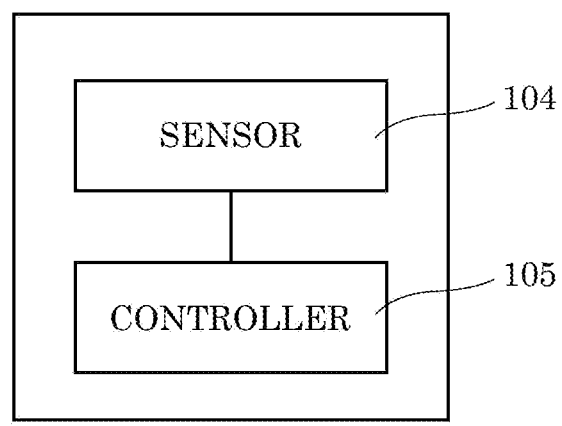
FIG. 4 illustrates an example structure of a base panel of Embodiment 1.

FIG. 4 illustrates an example structure of base panel 101 of Embodiment 1. As illustrated in FIG. 4, sensor 104 and controller 105 are located inside base panel 101. However, locations of sensor 104 and controller 105 are not limited to this. Sensor 104 and controller 105 may be located in the spacing between base panel 101 and display panel 102, 102A, or 102B, or in the cavity of display panel 102. By placing sensor 104 and controller 105 in the cavity of base panel 101 or the cavity of display panel 102, the shape of device control apparatus 100 will be simple and the thickness and weight device control apparatus 100 will be decreased.

Sensor 104 in FIG. 4 detects physical movement of display panel 102, 102A, or 102B. Sensor 104 detects the move direction and the move amount of display panel 102, 102A, or 102B in at least one of the right and left direction, the up and down direction, and the backward and forward direction from the original position of display panel 102, 102A, or 102B. Any type of sensor can be used as long as it can detect the move direction and the move amount of the physical movement of display panel 102, 102A, or 102B. If screen 106, 106A, or 106B is a touch screen panel, sensor 104 can also detect a touch on the screen by a user. When sensor 104 detects physical movement of display panel 102, 102A, or 102B, it generates and outputs a detection signal that indicates the move direction and the move amount of display panel 102, 102A, or 102B from its original position. Further, when sensor 104 detects a touch on the screen, it generates and outputs a detection signal that indicates the touched position on the screen. The detection signal is output to controller 105.

When controller 105 receives the detection signal from sensor 104, controller 105 generates a control signal to display some information associated with the detected movement of display panel 102, 102A, or 102B or detected touch on screen 106, 106A, or 106B. Based on the generated control signal, information associated with the detected movement or detected touch will be displayed on screen 106, 106A, or 106B. Further, controller 105 generates an instruction signal to instruct an outside device to perform a function item selected by the user. Details of controller 105 will be described later.

For example, when sensor 104 detects physical movement of display panel 102, 102A, or 102B by a user in a right and left direction, controller 105 generates a control signal to display first information on screen 106, 106A, or 106B. The first information is pre-associated with the right and left direction movement of display panel 102, 102A, or 102B. In another example, when sensor 104 detects physical movement of display panel 102, 102A, or 102B by the user in an up and down direction, controller 105 generates a control signal to display first information on screen 106, 106A, or 106B. The first information is pre-associated with the up and down direction movement of display panel 102. Further, in another example, when sensor 104 detects physical movement of display panel 102, 102A, or 102B in a backward and forward direction (push and/or pull), controller 105 generates a control signal to display first information on screen 106, 106A, or 106B. The first information is pre-associated with the backward and forward direction movement of display panel 102, 102A, or 102B.

First Example Display

Figure 5A:
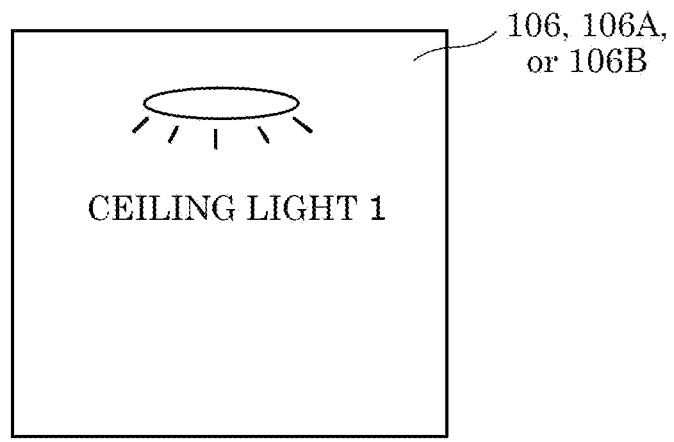
FIG. 5A illustrates an example display of Embodiment 1.

FIG. 5A illustrates an example display of first information on screen 106, 106A, or 106B. When the user makes a first movement of display panel 102, 102A, or 102B in the up and down direction, for example, a device identifier (e.g., "ceiling light 1") of a first outside device will be displayed on screen 106, 106A, or 106B. The device identifier displayed on the screen can be a nickname, a product name, an identification number or a combination thereof. When the user makes a further movement of display panel 102, 102A, or 102B or touches screen 106, 106A, or 106B, several function items (e.g., "ON/OFF," "Brighter or Darker" and "Warmer or Cooler") of the first outside device will be displayed on screen 106, 106A, or 106B. The number of function items displayed on the screen can be one or more depending on the number of functions of the corresponding outside device has.

It should be noted that the term "outside device" used in this disclosure is used to represent any electronic device that can be controlled by the device control apparatus of the present disclosure. Therefore, the "outside device" of the present disclosure can be any electronic device within an indoor space such as a house, a garage, an office space, a building, a parking lot, or a vehicle including a car, a van, and a truck. Also, the "outside device" can be any electronic device located outside of a house, a building, or attached to an outer surface of a vehicle such as a car, a van, a truck, a motorbike, or a bicycle.

If the device identifier displayed on screen 106, 106A, or 106B matches with the electronic device the user wants to control, the user can select one of its function items he or she wants to adjust by further moving display panel 102, 102A, or 102B in a certain direction. If the device identifier displayed on screen 106, 106A, or 106B does not match with the electronic device the user wants to control, the user is required to move display panel 102, 102A, or 102B again until a correct device identifier is displayed on screen 106, 106A, or 106B. For example, the user can change the displayed device identifier by moving display panel 102, 102A, or 102B in an upward direction.

If the outside device(s) that will be controlled based on the first movement of the display panel is the one(s) located in the move direction of the first movement, it is more user friendly because the user can use device control apparatus 100 by intuition. For example, in FIG. 5A, the displayed device ("ceiling light 1") is usually located in the upper portion of a room.

Figure 5B:
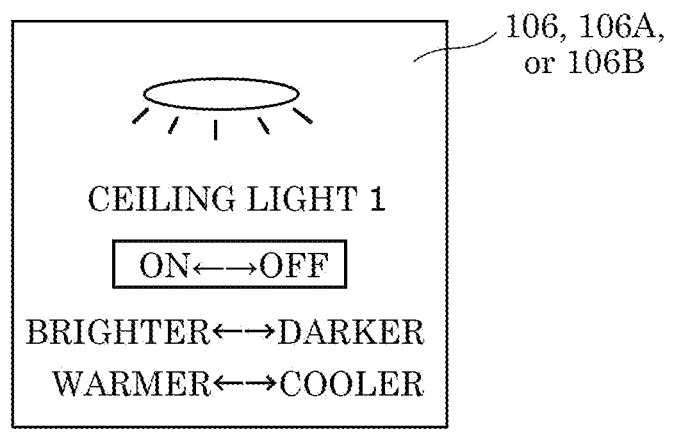
FIG. 5B illustrates an example display of Embodiment 1.
Figure 5C:
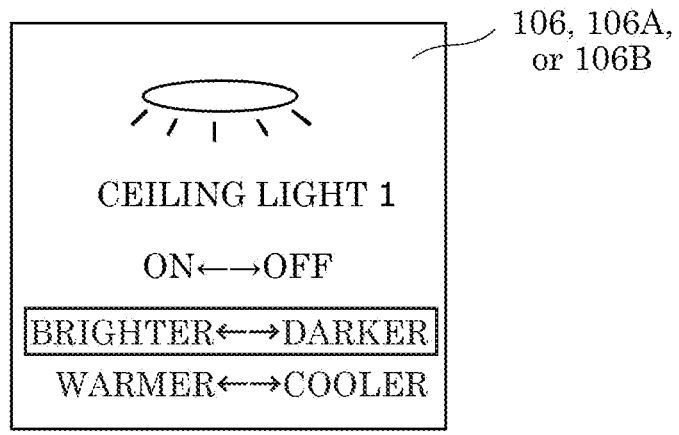
FIG. 5C illustrates an example display of Embodiment 1.
Figure 5D:
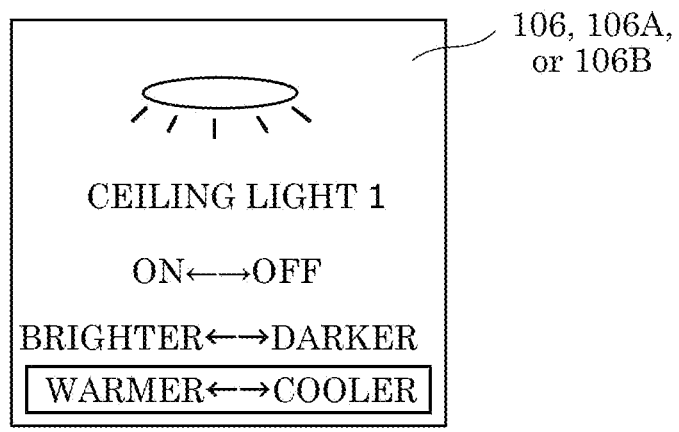
FIG. 5D illustrates an example display of Embodiment 1.

Next, the user can select one of the function items by moving display panel 102, 102A, or 102B, for example, downward or upward and by subsequently pushing display panel 102, 102A, or 102B toward base panel 101 (e.g., against the wall). FIG. 5B to FIG. 5D illustrate example display change according to the movement of display panel 102, 102A, or 102B. If the user wants to turn on or off ceiling light 1, the user should move display panel 102, 102A, or 102B downward once and push it once. If the user wants to adjust the brightness of ceiling light 1, the user should move display panel 102, 102A, or 102B downward twice and push it once. If the user wants to adjust the color of ceiling light 1, the user should move display panel 102, 102A, or 102B downward three times and push it once. It should be noted that the present disclosure is not limited to the example display change illustrated in FIG. 5B to FIG. 5D. Further, the necessary move direction is not limited to the above-described example.

Additionally, the user can select two or more function items he or she wants to adjust by moving display panel 102, 102A, or 102B in a certain direction while pushing display panel 102, 102A, or 102B. In another example, the user may select two or more of the function items by touching screen 106, 106A, or 106B.

After the user selects one or more of the displayed function items by moving display panel 102, 102A, or 102B or by touching screen 106, 106A, or 106B, the user needs to move display panel 102, 102A, or 102B in a right direction or a left direction, for example. In FIG. 5B, the user should move display panel 102, 102A, or 102B leftward if the user wants to turn on ceiling light 1 or should move display panel 102, 102A, or 102B rightward if the user wants to turn off ceiling light 1. In FIG. 5C, the user should move display panel 102, 102A, or 102B leftward if the user wants to make the brightness of ceiling light 1 brighter or should move display panel 102, 102A, or 102B rightward if the user wants to make it darker. In FIG. 5D, the user should move display panel 102, 102A, or 102B leftward if the user wants to adjust the color of ceiling light 1 to a warmer color or should move display panel 102, 102A, or 102B rightward if the user wants to adjust it to a cooler color.

When sensor 104 in FIG. 4 detects a physical movement of display panel 102 by the user in an up or down direction and/or in a backward direction, controller 105 generates an instruction signal to instruct the selected outside device to perform the function item selected by the user.

Second Example Display

Figure 6A:
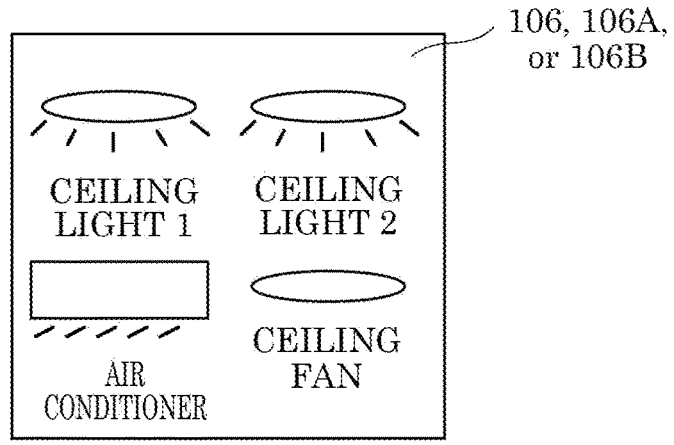
FIG. 6A illustrates another example display of Embodiment 1.
Figure 6B:
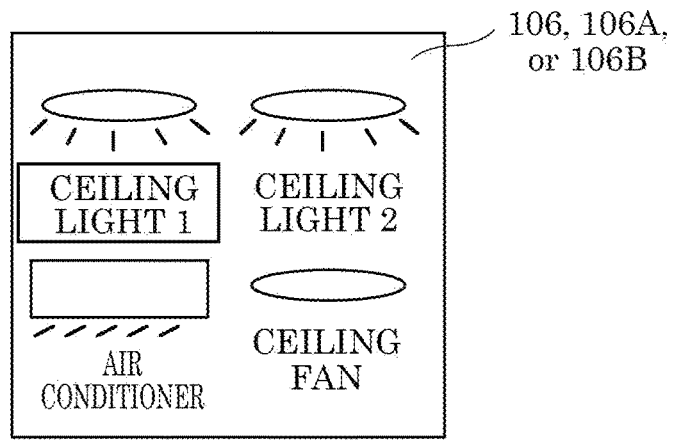
FIG. 6B illustrates another example display of Embodiment 1.
Figure 6C:
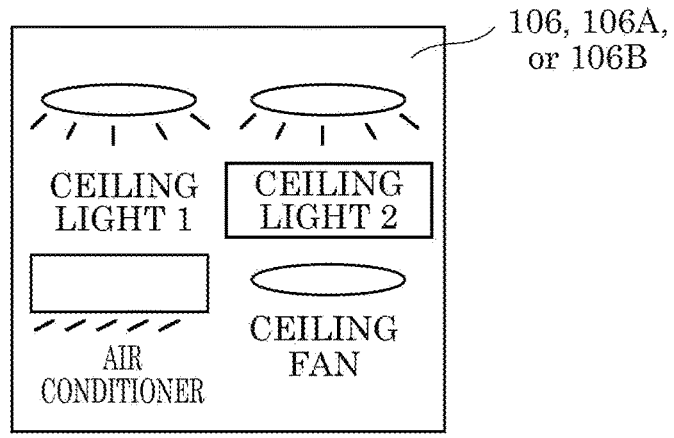
FIG. 6C illustrates another example display of Embodiment 1.
Figure 6D:
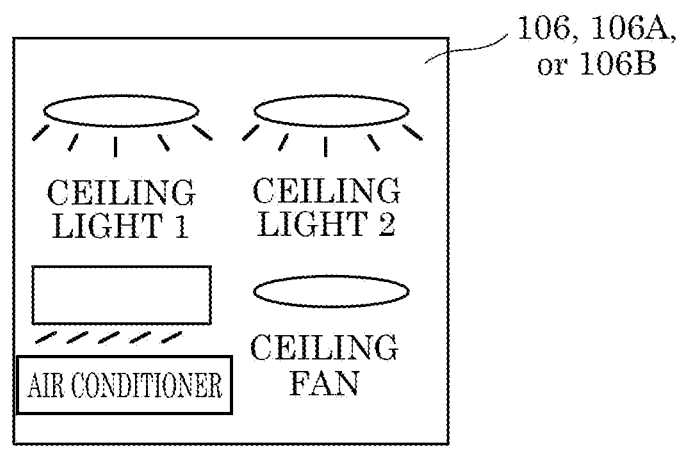
FIG. 6D illustrates another example display of Embodiment 1.
Figure 6E:
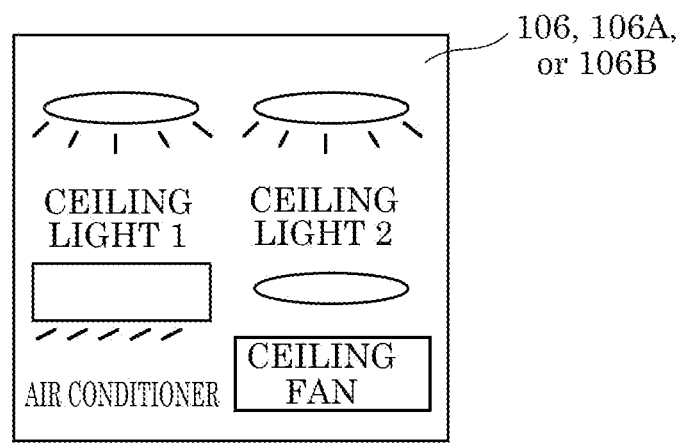
FIG. 6E illustrates another example display of Embodiment 1.

FIG. 6A illustrates another example display of first information on screen 106, 106A, or 106B of Embodiment 1. When the user makes a first movement of display panel 102, 102A, or 102B in the up and down direction, for example, a plurality of device identifiers (e.g., "ceiling light 1," "ceiling light 2," "air conditioner," and "ceiling fan") of respective outside devices will be displayed on screen 106, 106A, or 106B. The device identifier displayed on screen 106, 106A, or 106B can be a nickname, a product name, an identification number or a combination thereof. Although the number of device identifiers displayed on screen 106, 106A, or 106B is four in FIG. 6A, it is not limited to this. If the outside devices that will be controlled based on the first movement of display panel 102, 102A, or 102B are located in the move direction of the first movement, it is more user friendly because the user can use device control apparatus 100 by intuition. For example, in FIG. 6A, all of the displayed devices are usually located in the upper portion of a room.

If one of the device identifiers displayed on screen 106, 106A, or 106B matches with the electronic device the user wants to control, the user can select it by moving display panel 102, 102A, or 102B in a certain direction. FIG. 6B to FIG. 6E illustrate example display change according to the movement of display panel 102, 102A, or 102B. If the user wants to select ceiling light 1, the user should push display panel 102, 102A, or 102B backward once. If the user wants to select ceiling light 2, the user should move display panel 102, 102A, or 102B in the right direction and push it once. If the user wants to select the air conditioner, the user should move display panel 102, 102A, or 102B downward once and push it once. If the user wants to select the ceiling fan, the user should move display panel 102, 102A, or 102B downward once, in the right direction once and push it once. It should be noted that the present disclosure is not limited to the example display change illustrated in FIG. 6B to FIG. 6E. The necessary move direction is not limited to the above-described example. The user may touch screen 106, 106A, or 106B in order to select one of the displayed device identifiers.

Figure 7A:
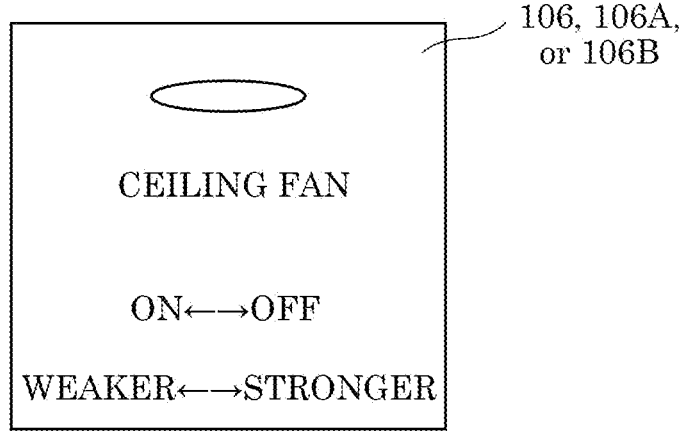
FIG. 7A illustrates another example display of Embodiment 1.
Figure 7B:
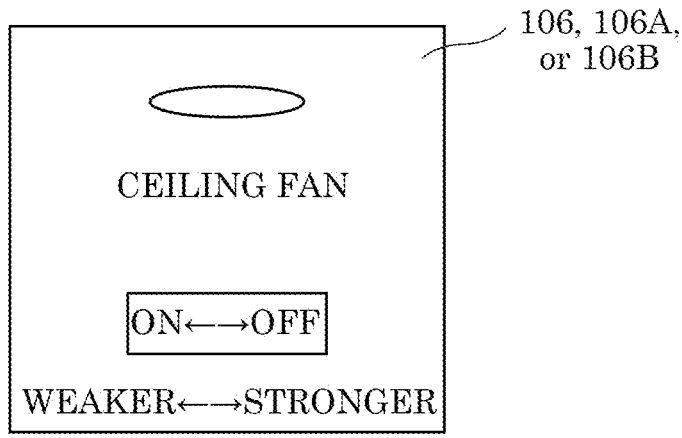
FIG. 7B illustrates another example display of Embodiment 1.
Figure 7C:
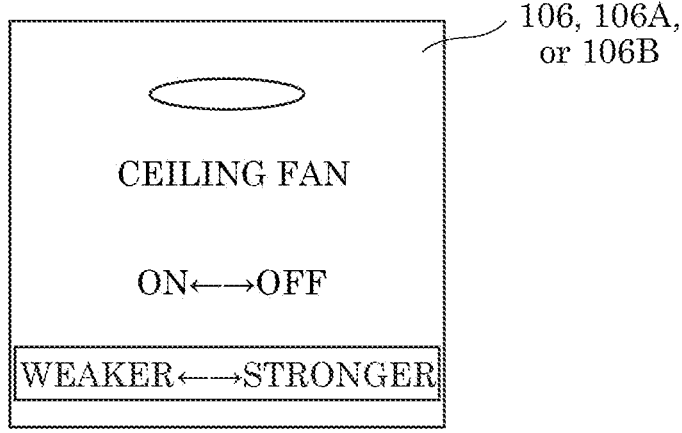
FIG. 7C illustrates another example display of Embodiment 1.

After selection of a device identifier is detected by sensor 104, second information associated with the selected device identifier will be displayed on screen 106, 106A, or 106B. FIG. 7A illustrates an example display of the second information on screen 106, 106A, or 106B. FIG. 7B and FIG. 7C illustrate example display change according to the movement of display panel 102, 102A, or 102B. As shown in FIG. 7A, the selected device identifier and its function items will be displayed. The user can select one of the displayed function items by moving display panel 102, 102A, or 102B in a similar way as described in the First Example Display (FIG. 7B and FIG. 7C).

It should be noted that selection of the device identifier and/or selection of function item may be done by a touch on the screen by the user in the example displays.

After selection of a certain device identifier is detected by sensor 104 in FIG. 2, controller 105 in FIG. 3 generates an instruction signal to display the first information or the second information on screen 106, 106A, or 106B in accordance with the detected movement of display panel 102, 102A, or 102B.

Further, after selection of at least one function item of the certain device identifier is detected by sensor 104, controller 105 generates an instruction signal to instruct an outside electronic device corresponding to the selected device identifier to adjust the function item in accordance with the detected movement of display panel 102, 102A, or 102B.

According to the above-described Embodiment 1, the user can control a plurality functions of an electronic device or can control a plurality of electronic devices in a simpler manner with a single device control apparatus 100, 100A, or 100B.

It should be noted that all interactions such as push and nudge will be facilitated with mechanical structures to acquire proper tactile feedback. The proper tactile feedback may or may not be enhanced with haptic motors. The haptic motors can be installed in base panel 101 or display panel 102, 102A, or 102B. The haptic motors can be installed in both base panel 101 and display panel 102, 102A, or 102B. The use of haptic motors gives a tactile feedback to the user, and the user can easily acknowledge that the user's actions are effectively conveyed to device control apparatus 100, 100A, or 100B.

Embodiment 2

Figure 8A:
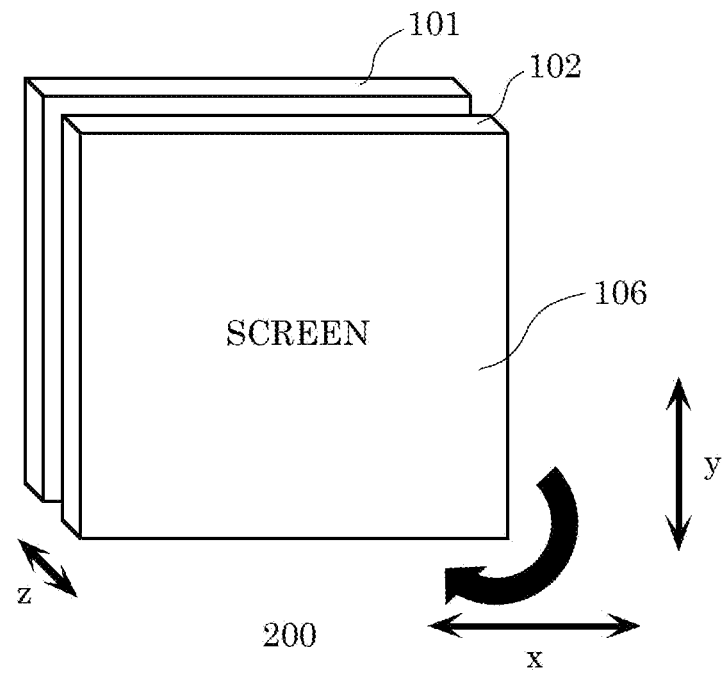
FIG. 8A illustrates an example of a device control apparatus of Embodiment 2.
Figure 8B:
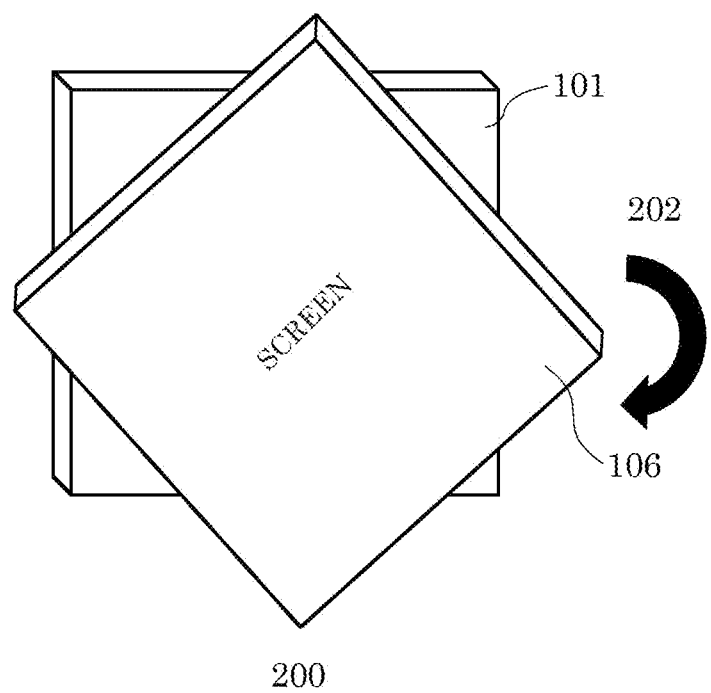
FIG. 8B illustrates an example of a device control apparatus of Embodiment 2.

FIG. 8A and FIG. 8B illustrate an example of device control apparatus 200 of Embodiment 2 of the present disclosure. Device control apparatus 200 in FIG. 8A includes base panel 101 and display panel 202 with a spacing in between. Furthermore, screen 106 is attached to the front surface of display panel 202. For brevity of description, only the differences between device control apparatus 100, 100A, or 100B of Embodiment 1 and device control apparatus 200 of Embodiment 2 will be described. Other structures, functions, display examples are the same as described in Embodiment 1. Components with the same reference numbers as in Embodiment 1 have the same structure or functions as described in Embodiment 1. It should be noted that the display panel in this embodiment can be called as a switch panel.

In Embodiment 2, display panel 202 is rotatable. In this case, the user can rotate display panel 202 clockwise or counterclockwise. The user can also move display panel 202 in at least one of a right and left direction (x direction), an up and down direction (y direction), and back and forth direction (z direction) before and after the rotation.

Figure 9:
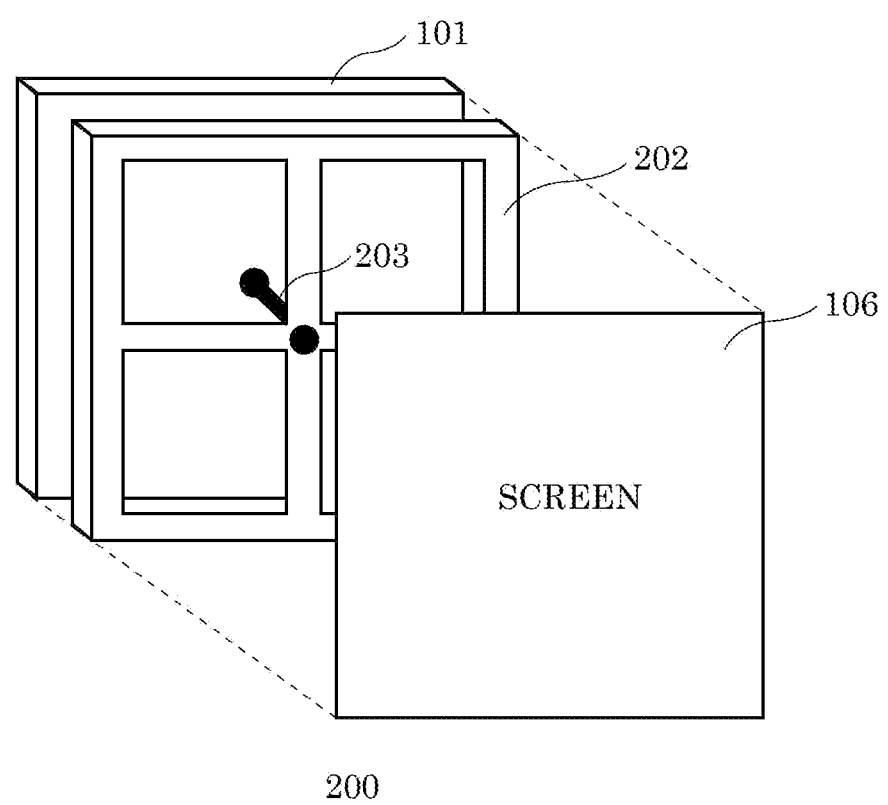
FIG. 9 illustrates an example structure of a device control apparatus of Embodiment 2.

FIG. 9 illustrates an example structure of device control apparatus 200 of Embodiment 2 of the present disclosure. Device control apparatus 200 includes base panel 101, display panel 202, a single connector 203, and screen 106.

Display panel 202 in FIG. 9 is attached to base panel 101 with a single connector 203. Connector 203 may be composed of a plurality of elements such as a screw and a holder, or a bolt and a nut so that display panel 202 can be rotated. Connector 203 can also be made of a spring, rubber, a string, or any other material that has an ability to hold and pull back display panel 102 to its original position when display panel 102 is pushed or pulled from its original position. Further, connector 203 may be composed of a plurality of elements such as a spring and a set of holders or a screw and a spring.

Figure 10A:
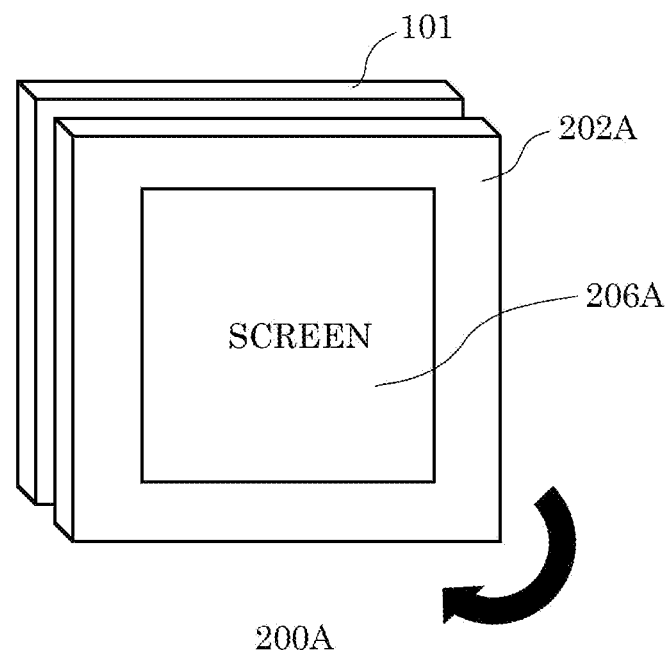
FIG. 10A illustrates another example of a device control apparatus of Embodiment 2.
Figure 10B:
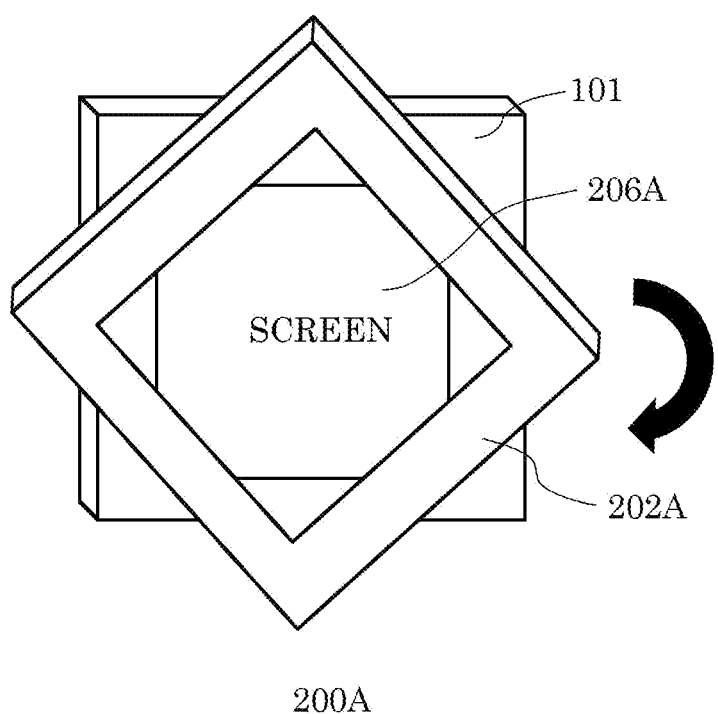
FIG. 10B illustrates another example of a device control apparatus of Embodiment 2.

FIG. 10A and FIG. 10B illustrate an example of device control apparatus 200A of Embodiment 2. In FIG. 10A and FIG. 10B, display panel 202A is a square-shaped frame and screen 206A is attached to a front surface of base panel 101 so that the user can see screen 206A through the square-shaped frame. In this example, display panel 202A is attached to base panel 101 with one or more invisible connector (not shown). As illustrated in FIG. 10A and FIG. 10B, display panel 202A is rotatable. It can be rotatable in a clockwise direction, in a counterclockwise direction or in both directions.

Figure 10C:
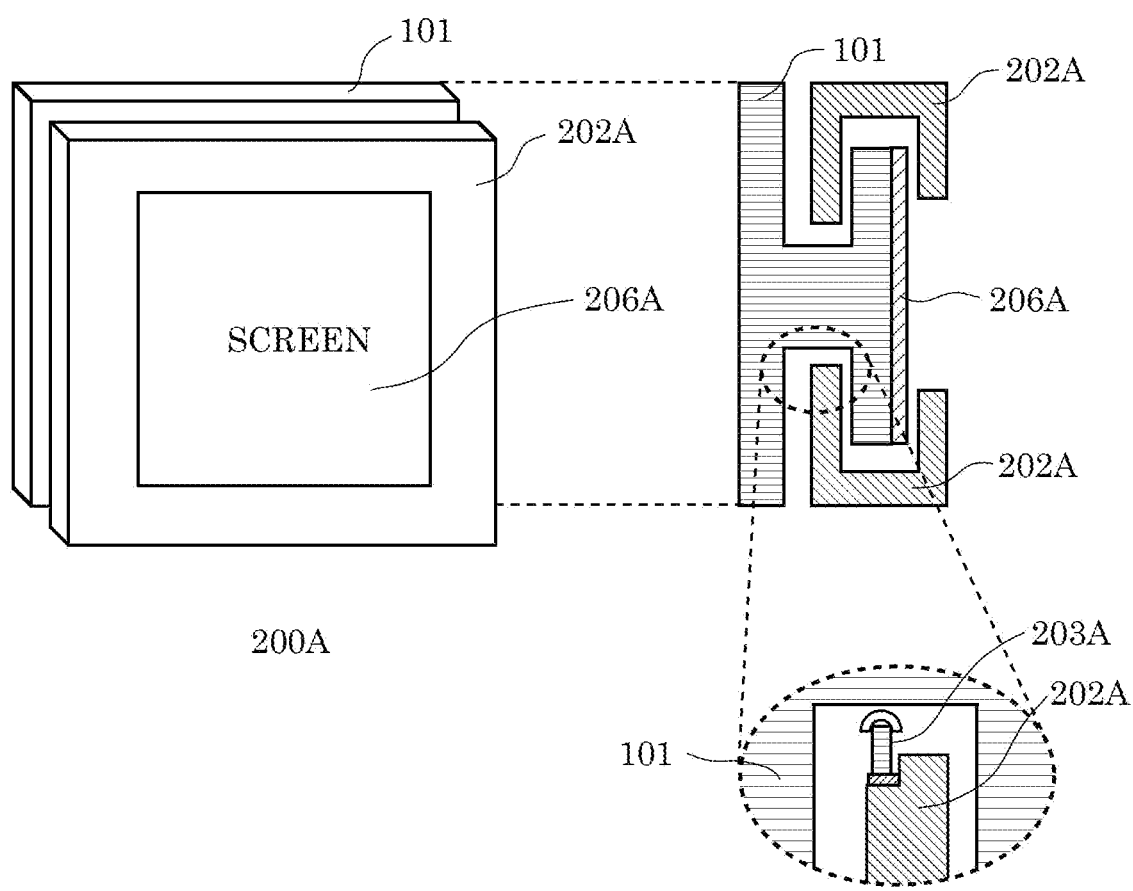
FIG. 10C illustrates an example structure of a device control apparatus of Embodiment 2.

FIG. 10C illustrates an example structure of device control apparatus 200A in FIG. 10A and FIG. 10B. As shown in FIG. 10C, screen 206A is attached on a front surface of the front portion of base panel 101 and is partially covered by display panel (square-shaped frame) 202A. The back portion of base panel 101 can be attached to a wall or installed in a wall hole. In this example structure, display panel 202A is attached to base panel 101 with a plurality of connectors 203A. Each of connectors 203A can be made of a spring and holds display panel 202A in place. Connectors 203A may be attached on display panel 202A or may be attached on base panel 101. It should be noted that locations of the connectors are not limited to this example. The structure in FIG. 10C facilitates providing a stress-free display of information to the user because screen 206A is not rotated even if display panel 202A is rotated by the user.

Figure 11A:
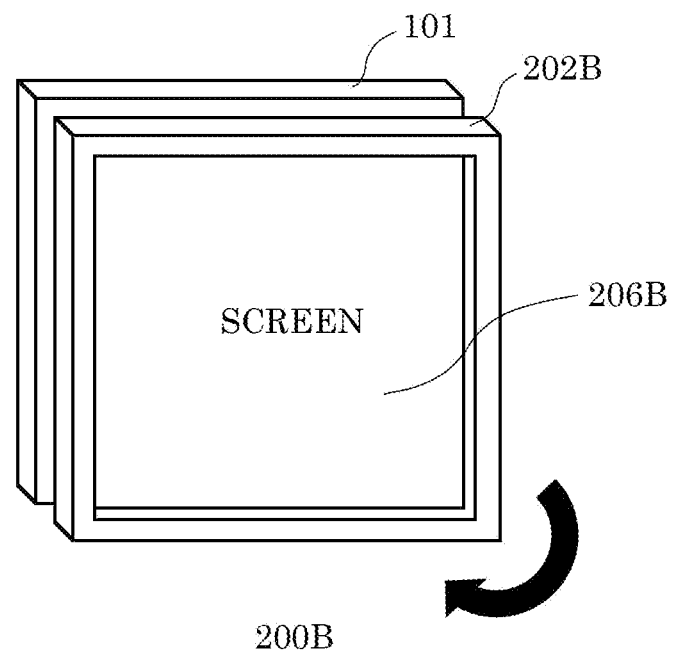
FIG. 11A illustrates another example of a device control apparatus of Embodiment 2.
Figure 11B:
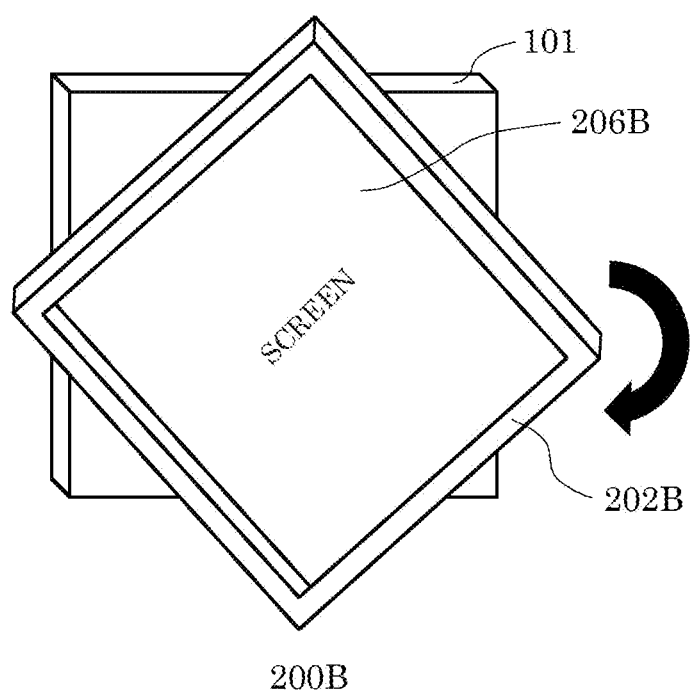
FIG. 11B illustrates another example of a device control apparatus of Embodiment 2.

FIG. 11A and FIG. 11B illustrate an example of device control apparatus 200B of Embodiment 2. In FIG. 11A and FIG. 11B, display panel 202B is a square-shaped frame and screen 206B is attached to a back surface of display panel 202B so that the user can see screen 206B through the square-shaped frame. Display on screen 206B is automatically rotated according to rotation of display panel 202B. In this example, display panel 202B is attached to base panel 101 with one or more connectors (not shown).

Similar to Embodiment 1, screens 106, 206A, and 206B in FIG. 9, FIG. 10A to FIG. 10C, and FIG. 11A and FIG. 11B may be utilized by a known electronic paper display technology. This allows screens 106, 206A, and 206B to always display information even when there is no interaction by the user. Such electronic paper display technology includes the E-Ink (electronic ink) technology.

When display panel 202, 202A, or 202B is rotated by the user as shown in FIG. 8B, FIG. 10A to FIG. 10B, or FIGS. 11A and 11B, sensor 104 in FIG. 2 detects rotation degrees and a rotation direction of display panel 202, 202A, or 202B. For example, when sensor 104 detects 90-degree or more rotation of display panel 202, 202A, or 202B, controller 105 controls display of information on screen 106, 206A, or 206B. In another example, when sensor 104 detects 90-degree or more rotation of display panel 202, 202A, or 202B, controller 105 performs control to clear display of information on screen 106, 206A, or 206B.

The user may select one of the function items as shown in FIG. 5A to FIG. 5D by rotating display panel 202, 202A, or 202B. Alternatively, the user may adjust the selected function by rotating display panel 202, 202A, or 202B. For example, when the user wants to turn on or off the ceiling light in FIG. 5B, the user can turn on ceiling light 1 by rotating display panel 202, 202A, or 202B counterclockwise 90-degrees or more (ON) and can turn off ceiling light 1 by rotating display panel 202, 202A, or 202B clockwise 90-degrees or more (OFF). For another example, when the user wants to adjust the brightness of the ceiling light in FIG. 5C, the user can adjust the brightness of ceiling light 1 by rotating display panel 202, 202A, or 202B counterclockwise (brighter) or clockwise (darker). For another example, when the user wants to adjust the color of the ceiling light in FIG. 5D, the user can adjust the color of ceiling light 1 by rotating display panel 202, 202A, or 202B counterclockwise (warmer) or clockwise (cooler). In the last two examples, the user can adjust the function depending on the rotation degrees. By using a rotatable display panel 202, 202A, or 202B, the user experience will be increased because the user can adjust the function item of the selected outside device more easily and subtler adjustment becomes available.

Further, controller 105 may change the content of the first information or second information depending on the degree of the rotation of display panel 202, 202A, or 202B in FIG. 8A and FIG. 8B, FIG. 10A to FIG. 10C, or FIG. 11A and FIG. 11B.

According to the above-described Embodiment 2, the user can control each of the plurality functions of an electronic device more precisely in a simpler manner with a single device control apparatus 200, 200A, or 200B.

A push or nudge on the edge of display panel 202, 202A, or 202B by the user may be combined with or replace some of the above-described rotations and may be associated with display of some information on the screen.

It should be noted that all interactions such as rotate, push and nudge will be facilitated with mechanical structures to acquire proper tactile feedback. The proper tactile feedback may or may not be enhanced with haptic motors. The haptic motors can be installed in base panel 101 or display panel 202, 202A, 202B. The haptic motors can be installed in both base panel 101 and display panel 202, 202A, or 202B. The use of haptic motors gives a tactile feedback to the user, and the user can easily acknowledge the user's actions are effectively conveyed to device control apparatus 200, 200A, or 200B.

Embodiment 3

Figure 12:
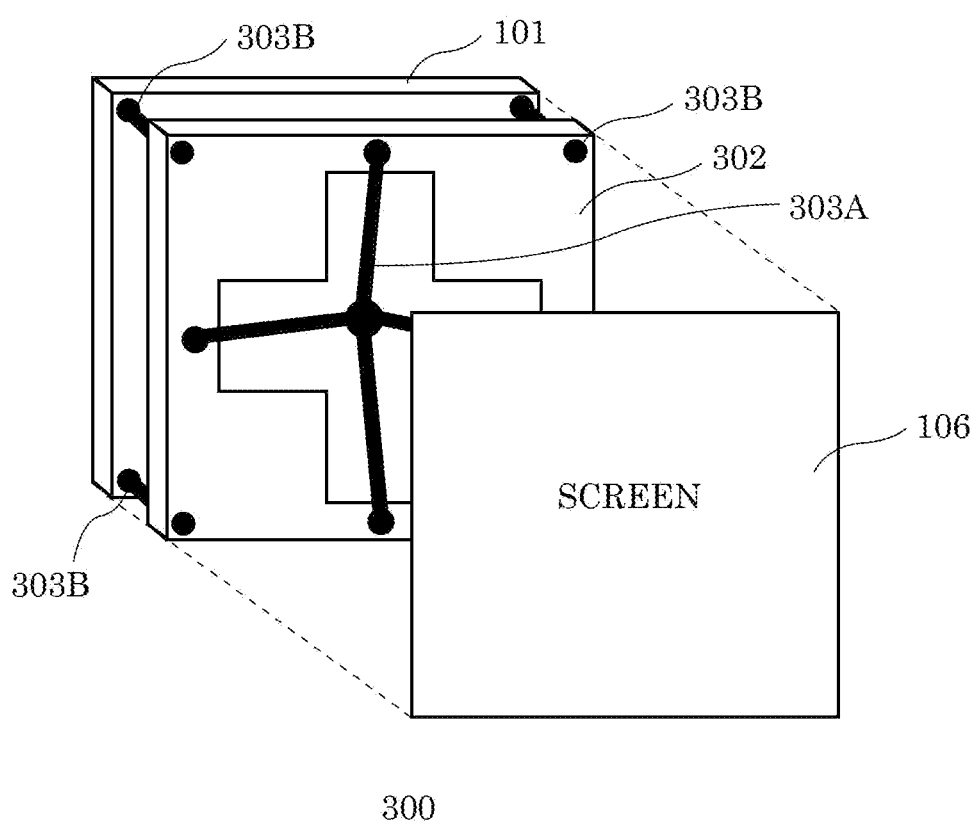
FIG. 12 illustrates an example structure of a device control apparatus of the Embodiment 3.

FIG. 12 illustrates an example structure of device control apparatus 300 of Embodiment 3 of the present disclosure. Device control apparatus 300 includes base panel 101, display panel 302, a plurality of connectors 303, and screen 106. For the brevity of description, only the differences between device control apparatus 100, 100A, or 100B of Embodiment 1 and device control apparatus 300 of Embodiment 3 will be described. Other structures, functions, display examples are the same as described in Embodiment 1 or Embodiment 2. Components with the same reference numbers as in Embodiment 1 or Embodiment 2 have the same structure or functions as described in Embodiment 1 or Embodiment 2. It should be noted that the display panel in this embodiment can be called as a switch panel.

Display panel 302 in FIG. 12 is positioned over base panel 101 with a spacing in between. Display panel 302 is attached to base panel 101 with a plurality of connectors 303A and 303B. The center connector 303A comprises four bonding parts, each of which connects base panel 101 and display panel 302. Each of the bonding parts can be made of a spring, rubber, a string, or any other material that has an ability to pull back display panel 302 to its original position when display panel 302 is moved from its original position. Each of the outer connectors 303B can be made of a spring, rubber, a string, or any other material. Alternatively, each of the outer connectors 303B may be composed of a plurality of elements such as a screw and a holder, or a bolt and a nut, as long as it connects display panel 302 with base panel 101. Although the number of outer connectors 303B is four in FIG. 12, the number of outer connectors is not limited to this.

Display panel 302 in FIG. 12 has a cross-shaped cavity so that the four bonding of the center connector 303A can be accommodated. It is noted that the shape of the cavity is not limited to the example illustrated in FIG. 12. The cavity can be round, oval, or star-shaped, for example.

Further, screen 106 is attached to display panel 302. Screen 106 may cover a front surface of display panel 302 or may cover a portion of the front surface of display panel 302 so that the cavity will not be visible. In FIG. 12, display panel 302 is located in its original position. Similar to device control apparatus 100 in FIG. 1, display panel 302 in FIG. 12 with screen 106 attached is moveable in at least one of a right and left direction, an up and down direction, and a backward and forward direction from its original position.

Similar to Embodiment 1, sensor 104 and controller 105 are located inside base panel 101 in FIG. 9. The structures and functions of sensor 104 and controller 105 are the same as described in Embodiment 1.

Furthermore, similar to Embodiments 1 and 2, screen 106 in FIG. 12 may be utilized by a known electronic paper display technology. This allows screen 106 to always display information even when there is no interaction by the user. Such electronic paper display technology includes the E-Ink (electronic ink) technology.

According to the above-described Embodiment 3, the user can control a plurality functions of an electronic device or can control a plurality of electronic devices in a simpler manner with a single device control apparatus 300.

It should be noted that all interactions such as push or nudge will be facilitated with mechanical structures to acquire proper tactile feedback. The proper tactile feedback may or may not be enhanced with haptic motors. The haptic motors can be installed in base panel 101 or display panel 302. The haptic motors can be installed in both base panel 101 and display panel 302. The use of haptic motors gives a tactile feedback to the user, and the user can easily acknowledge that the user's actions are effectively conveyed to device control apparatus 300.

Embodiment 4

Figure 13:
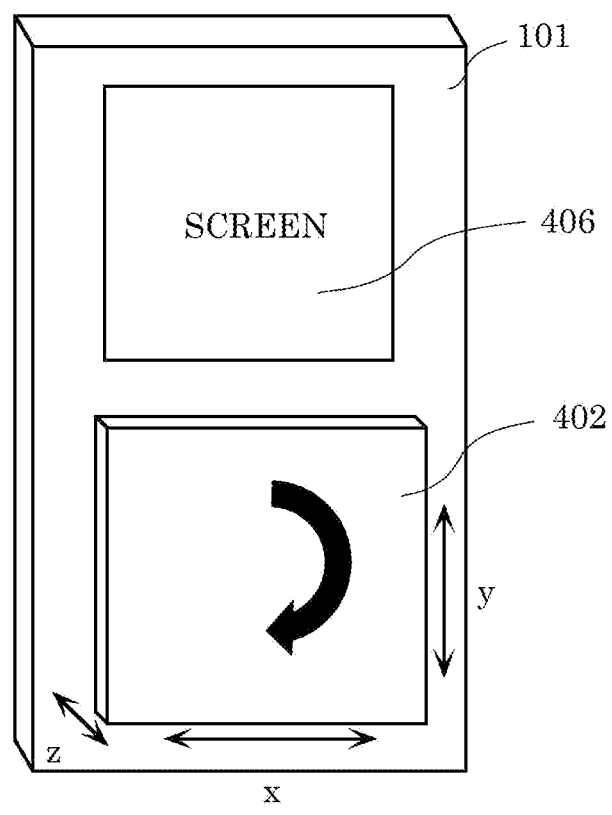
FIG. 13 illustrates an example structure of a device control apparatus of the Embodiment 4.

FIG. 13 illustrates an example structure of device control apparatus 400 of Embodiment 4 the present disclosure. Device control apparatus 400 includes base panel 101, switch panel 402, and screen 406. For the brevity of description, only the differences between device control apparatus 100 of Embodiment 1 and device control apparatus 400 of Embodiment 4 will be described. Other structures, functions, display examples are the same as described in Embodiment 1 or Embodiment 2.

As can be seen from FIG. 13, screen 406 is attached on base panel 101 and is located separately from switch panel 402. Similar to Embodiments 1 to 3, screen 406 in FIG. 13 may be utilized by a known electronic paper display technology. This allows screen 406 to always display information even when there is no interaction by the user. Such electronic paper display technology includes the E-Ink (electronic ink) technology. Screen 406 can be a touch-sensor.

Base panel 101 in FIG. 13 contains sensor 104 and controller 105 as shown in FIG. 4. Base panel 101 may further contain a battery. It may also contain a speaker. Base panel 101 in FIG. 13 also works a housing of device control apparatus 400. Similar to display panel 202 of Embodiment 2, switch panel 402 in FIG. 13 is rotatable. The user can rotate switch panel 402 clockwise or counterclockwise. The user can also move switch panel 402 in at least one of a right and left direction (x direction), an up and down direction (y direction), and a back-and-forth direction (z direction) before and after the rotation. The movement in the right and left direction and in the up and down direction may be implemented by push or nudge by the user of switch panel 402.

EXAMPLE DISPLAY

Figure 14A:
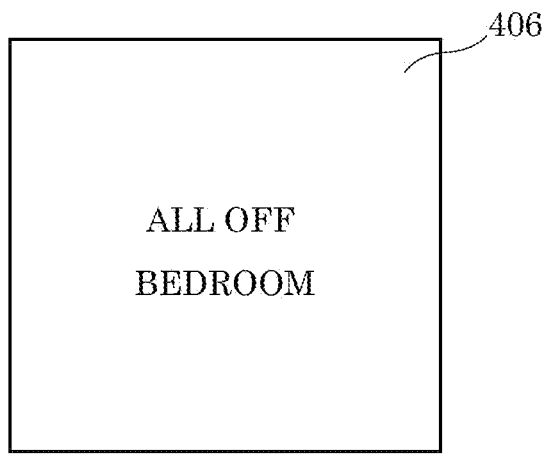
FIG. 14A illustrates an example display change of Embodiment 4.

FIG. 14A to FIG. 14K illustrate an example display change on screen 406. FIG. 14A shows an example initial display that indicates that all the lights in the bedroom are off.

Figure 14B:
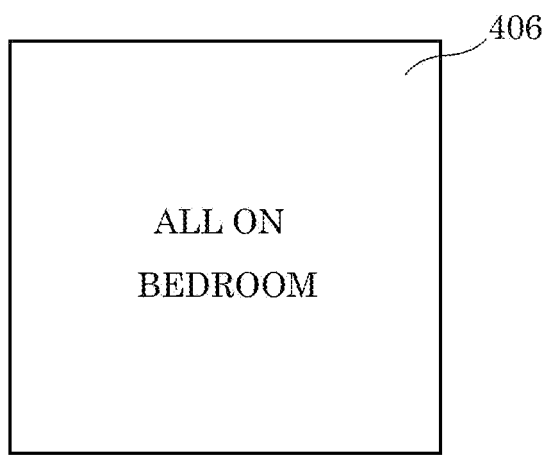
FIG. 14B illustrates an example display change of Embodiment 4.

When the user pushes switch panel 402 in FIG. 13, sensor 104 in base panel 101 detects the push movement and controller 105 controls to change the displays on screen 406 as shown in FIG. 14B. Controller 105 also sends instruction signals to turn on all the lights in the bedroom.

Figure 14C:
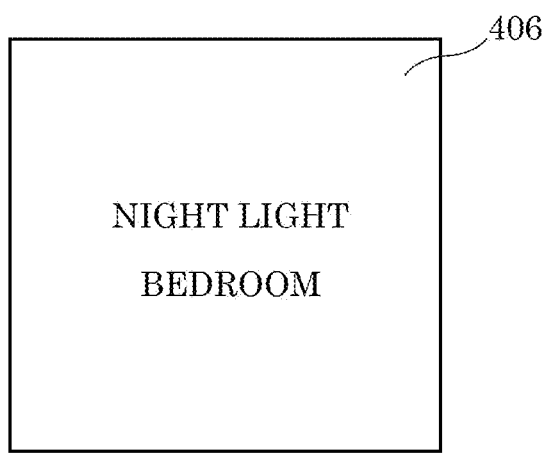
FIG. 14C illustrates an example display change of Embodiment 4.
Figure 14D:
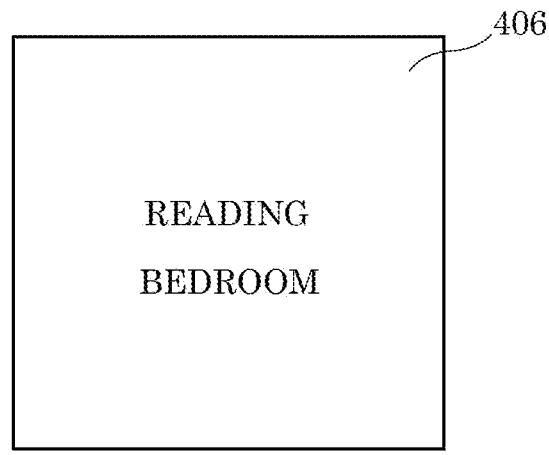
FIG. 14D illustrates an example display change of Embodiment 4.
Figure 14E:
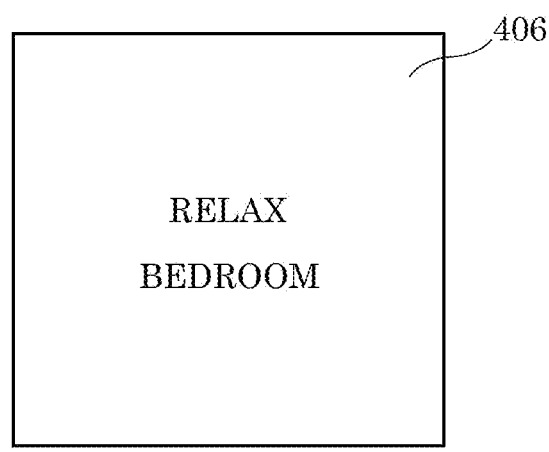
FIG. 14E illustrates an example display change of Embodiment 4.

Then, the user rotates switch panel 402 more than 90 degrees clockwise or counterclockwise, sensor 104 in base panel 101 detects the rotation and controller 105 controls to change the mode to be displayed on screen 406 as shown in FIG. 14C to FIG. 14E. Controller 105 also sends instruction signals to the light devices to change or adjust their color, tone, and/or warmth depending on the displayed mode.

Figure 14F:
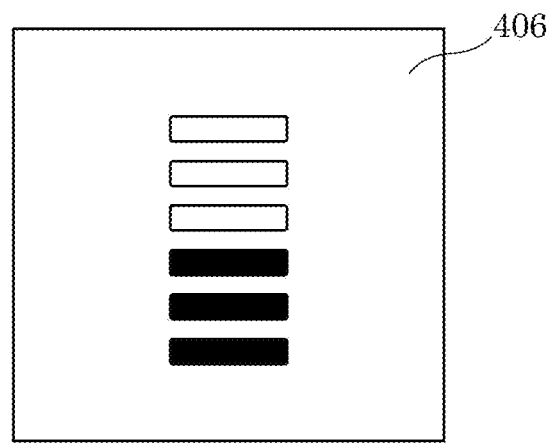
FIG. 14F illustrates an example display change of Embodiment 4.
Figure 14G:
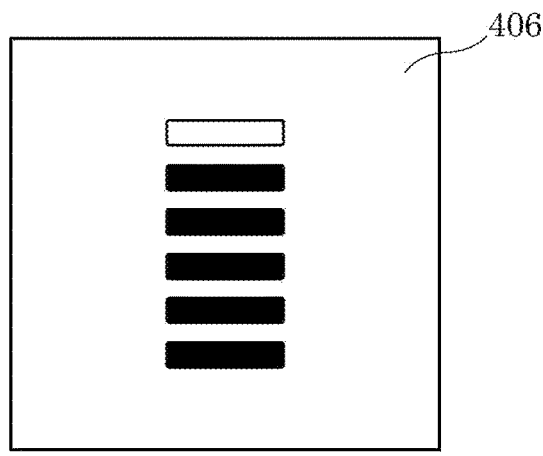
FIG. 14G illustrates an example display change of Embodiment 4.
Figure 14H:
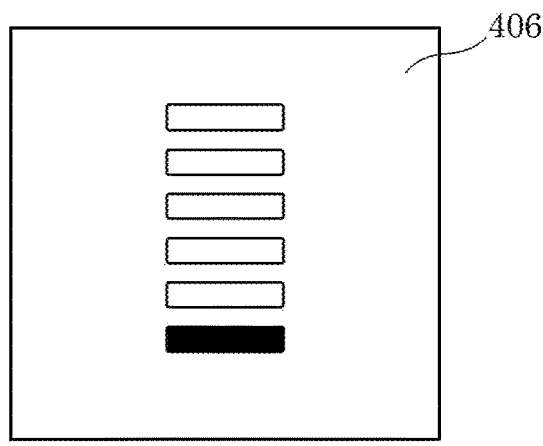
FIG. 14H illustrates an example display change of Embodiment 4.

When the user nudges switch panel 402 upwards or downwards, the display of screen 406 will be changed as shown in FIG. 14F. As the user continues to nudge switch panel 402 upwards, the number of light bars increases as shown in FIG. 14G, indicating that the brightness of the lights increases. Similarly, as the user continues to nudge switch panel 402 downwards, the number of light bars decreases increases as shown in FIG. 14H, indicating that the brightness of the lights decreases. When the upward or downward nudge is finished, a confirmation button and/or a confirmation message may be displayed on screen 406. In this case, adjustment of the brightness of the lights may be executed after a touch on the confirmation button is detected. In this way, the user can easily control the mode and brightness of the lights the user wants to control.

Figure 14I:
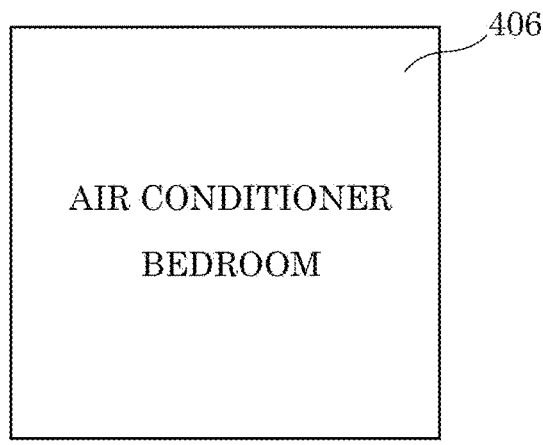
FIG. 14I illustrates an example display change of Embodiment 4.
Figure 14J:
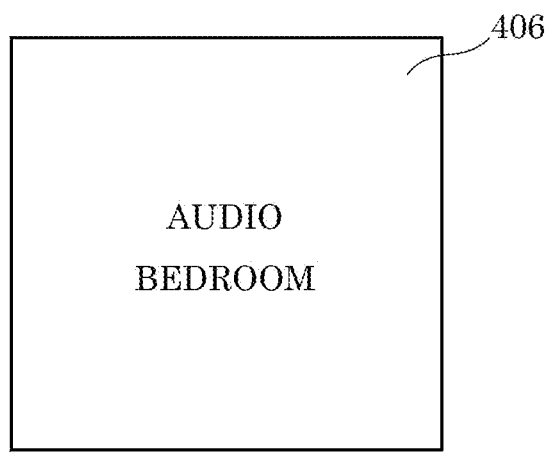
FIG. 14J illustrates an example display change of Embodiment 4.
Figure 14K:
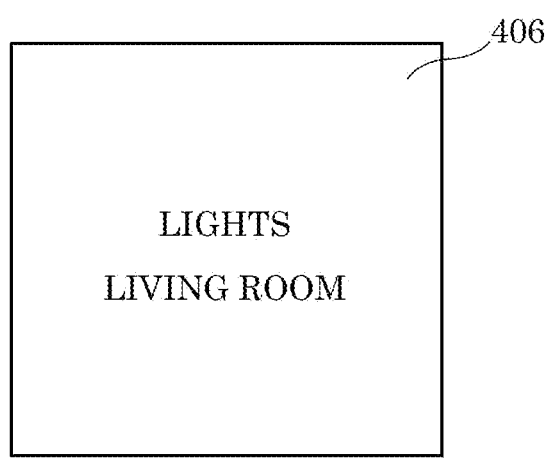
FIG. 14K illustrates an example display change of Embodiment 4.

When the user nudges switch panel 402 side to side (right or left direction), the display of screen 406 will be changed as shown in FIG. 14I to FIG. 14K. When the user finds a specific device or appliance that the user wants to control, the user may push switch panel 402 to turn on or off. The user may rotate switch panel 402 to change the mode or function. The user may nudge upward or downwards switch panel 402 to adjust the brightness or strength of a specific function. In this way, the user can easily select and control devices or appliances the user wants to control.

According to the above-described Embodiment 4, the user can control a plurality functions of an electronic device or can control a plurality of electronic devices in a simpler manner with a single device control apparatus 400.

It should be noted that all interactions such as push or nudge will be facilitated with mechanical structures to acquire proper tactile feedback. The proper tactile feedback may or may not be enhanced with haptic motors. The haptic motors can be installed in base panel 101 or switch panel 402. The haptic motors can be installed in both base panel 101 and switch panel 402. The use of haptic motors gives a tactile feedback to the user, and the user can easily acknowledge that the user's actions are effectively conveyed to device control apparatus 400.

It should be noted that the scope of this disclosure is not limited to the above-described embodiments. The above-described embodiments can be combined.

Although in the above-described embodiments, the switch panel is implemented by a mechanical structure, the switch panel is not limited to this. For example, the switch panel may be implemented as a graphical object that is displayed on a screen. In this case, the user can rotate and/or move the switch panel by touching and/or nudging the switch panel displayed on the screen.

The present disclosure can be realized by software, hardware, or software in cooperation with hardware. Each functional block used in the description of each embodiment described above can be realized by an LSI such as an integrated circuit, and each process described in each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra-LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

What is claimed is:

1. A device control apparatus, comprising:
   a base panel;
   a screen which, in operation, displays information;
   a switch panel positioned over the base panel with a spacing in between, the switch panel being rotatable and moveable in at least one of a right and left direction, an up and down direction, and a backward and forward direction from an original position of the switch panel;
   one or more connectors that moveably connect the switch panel and the base panel;
   a sensor which, in operation, detects a movement of the switch panel; and
   a controller which, in operation, controls:
      displaying, on the screen, first information associated only with a plurality of outside devices located in a same move direction as a first movement of the switch panel, the first information including device identifiers each enabling identification of a different one of the plurality of outside devices located in the same move direction as the first movement of the switch panel and that are selectable with respect to the device control apparatus;
      selecting an outside device out of the plurality of outside devices;
      displaying, on the screen in response to a second movement of the switch panel detected after the first movement, (i) second information including a plurality of function items or modes of the outside device selected and (ii) third information on the outside device selected;
      instructing the outside device selected to perform a function item or change a mode selected by a user in response to the displaying of the second information; and
      continuing of the displaying of the second information and the third information on the outside device selected, while the instructing is being performed.

2. The device control apparatus according to claim 1, wherein
   the first information includes at least one of the following information of the plurality of outside devices: a nickname; a product name; or an identification number.

3. The device control apparatus according to claim 1, wherein
   the switch panel is rotatable clockwise.

4. The device control apparatus according to claim 3, wherein
   when the sensor detects 90-degree or more rotation of the switch panel, the controller controls displaying information associated with the rotation detected on the screen.

5. The device control apparatus according to claim 3, wherein when the sensor detects 90-degree or more rotation of the switch panel, the controller controls to clear display of information on the screen.

6. The device control apparatus according to claim 3, wherein
content of the first information is different depending on a degree of rotation of the switch panel.

7. The device control apparatus according to claim 1, wherein
the controller controls displaying a confirmation button on the screen and instructing the one outside device to perform the function item selected, after touch of the confirmation button is detected.

8. The device control apparatus according to claim 1, wherein
the one or more connectors are springs, each of which pulls back the switch panel to the original position of the switch panel when the switch panel is moved from the original position.

9. The device control apparatus according to claim 1, wherein
the base panel is installed in a wall hole of an indoor space and the at least one outside device is located in the indoor space.

10. A device control method for a device control apparatus including a base panel, a screen, and a switch panel moveably positioned over the base panel, the device control method comprising:

detecting movement of the switch panel, the movement of the switch panel including rotation of the switch panel and movement in at least one of a right and left direction, an up and down direction, and a backward and forward direction from an original position of the switch panel;

displaying, on the screen, first information associated only with a plurality of outside devices located in a same move direction as a first movement of the switch panel, the first information including device identifiers each enabling identification of a different one of the plurality of outside devices located in the same move direction as the first movement of the switch panel and that are selectable with respect to the device control apparatus;

selecting an outside device out of the plurality of outside devices;

displaying, on the screen in response to a second movement of the switch panel or a touch on the screen detected after the first movement, (i) second information including a plurality of function items or modes of the outside device selected and (ii) third information on the outside device selected;

instructing the outside device selected to perform a function item or change a mode selected by a user in response to the displaying of the second information; and continuing of the displaying of the second information and the third information on the outside device selected, while the instructing is being performed.

* * * * *